US007647268B1

(12) United States Patent
Bonner et al.

(10) Patent No.: US 7,647,268 B1
(45) Date of Patent: Jan. 12, 2010

(54) SYSTEM AND METHOD FOR IMPLEMENTING A RECURRENT BIDDING PROCESS

(75) Inventors: Brian K. Bonner, Waynesboro, PA (US); Jose L. Zapata, Newark, DE (US); Mike Wilson Caraballo, San Antonio, TX (US); Jonathon William Albright, Raleigh, NC (US); Robert L. Watson, Jr., Fairfield, PA (US)

(73) Assignee: JPMorgan Chase Bank, N.A., New York, NY (US)

( * ) Notice: Subject to any disclaimer, the term of this patent is extended or adjusted under 35 U.S.C. 154(b) by 342 days.

(21) Appl. No.: 11/417,049

(22) Filed: May 4, 2006

(51) Int. Cl.
*G06Q 40/00* (2006.01)
(52) U.S. Cl. .................. 705/37; 705/35; 705/36 R; 705/38; 705/39; 705/40; 707/202
(58) Field of Classification Search .................... 705/38
See application file for complete search history.

(56) References Cited

U.S. PATENT DOCUMENTS

| 4,169,285 | A | 9/1979 | Walker |
| 4,648,038 | A | 3/1987 | Roberts et al. |
| 4,739,478 | A | 4/1988 | Roberts et al. |
| 4,742,457 | A | 5/1988 | Leon et al. |
| 4,752,877 | A | 6/1988 | Roberts et al. |
| 4,933,842 | A | 6/1990 | Durbinet et al. |
| 5,121,469 | A | 6/1992 | Richards et al. |
| 5,222,019 | A | 6/1993 | Yoshino et al. |

(Continued)

FOREIGN PATENT DOCUMENTS

WO        WO 98/43170        10/1998

(Continued)

OTHER PUBLICATIONS

Manco et al., A Framework For Adaptive Mail Classification, 14th IEEE Conference on Tools with Artificial Intelligence (ICTAI'02), Nov. 4, 2002, p. 387.

(Continued)

*Primary Examiner*—Kirsten S Apple
(74) *Attorney, Agent, or Firm*—Goodwin Procter LLP (57) ABSTRACT

A system and method for implementing a recurrent bidding process is disclosed. According to one embodiment, a method for implementing a recurrent bidding process to dispose of a portfolio of consumer debts may comprise the steps of: offering the portfolio of consumer debts in an initial bidding among a plurality of potential buyers to identify a first buyer and a second buyer, wherein the first buyer is the highest bidder in the initial bidding and is allocated a first portion of the portfolio, and wherein the second buyer is the next highest bidder in the initial bidding and is allocated a second portion of the portfolio; maintaining the allocation of the portfolio of consumer debts between the first buyer and the second buyer for a first time period; designating a portion of the portfolio as an at-risk volume for a second time period; offering the at-risk volume in a second bidding between the first buyer and the second buyer, wherein the highest bidder in the second bidding is allocated the at-risk volume; and maintaining the resulting allocation of the portfolio of consumer debts between the first buyer and the second buyer for the second time period.

11 Claims, 6 Drawing Sheets

U.S. PATENT DOCUMENTS

| | | |
|---|---|---|
| 5,257,369 A | 10/1993 | Skeen et al. |
| 5,270,922 A | 12/1993 | Higgins |
| 5,297,032 A | 3/1994 | Trojan et al. |
| 5,305,200 A | 4/1994 | Hartheimer et al. |
| 5,419,890 A | 5/1995 | Saidi |
| 5,454,104 A | 9/1995 | Steidlmayer et al. |
| 5,462,438 A | 10/1995 | Becker et al. |
| 5,497,317 A | 3/1996 | Hawkins et al. |
| 5,517,406 A | 5/1996 | Harris et al. |
| 5,557,798 A | 9/1996 | Skeen et al. |
| 5,592,379 A | 1/1997 | Finfrock et al. |
| 5,649,186 A | 7/1997 | Ferguson |
| 5,675,746 A | 10/1997 | Marshall |
| 5,706,502 A | 1/1998 | Foley et al. |
| 5,710,889 A | 1/1998 | Clark et al. |
| 5,724,593 A | 3/1998 | Hargrave, III et al. |
| 5,778,157 A | 7/1998 | Oatman et al. |
| 5,787,402 A | 7/1998 | Potter et al. |
| 5,806,047 A | 9/1998 | Hackel et al. |
| 5,806,048 A | 9/1998 | Kiron et al. |
| 5,819,273 A | 10/1998 | Vora et al. |
| 5,832,461 A | 11/1998 | Leon et al. |
| 5,845,266 A | 12/1998 | Lupien et al. |
| 5,864,827 A | 1/1999 | Wilson |
| 5,890,140 A | 3/1999 | Clark et al. |
| 5,913,214 A | 6/1999 | Madnick et al. |
| 5,918,218 A | 6/1999 | Harris et al. |
| 5,922,044 A | 7/1999 | Banthia |
| 5,940,810 A | 8/1999 | Traub et al. |
| 5,944,784 A | 8/1999 | Simonoff et al. |
| 5,946,667 A | 8/1999 | Tull, Jr. et al. |
| 5,950,176 A | 9/1999 | Keiser et al. |
| 5,966,531 A | 10/1999 | Skeen et al. |
| 5,966,672 A | 10/1999 | Knupp |
| 5,970,479 A | 10/1999 | Shepherd |
| 5,986,673 A | 11/1999 | Martz |
| 5,995,943 A | 11/1999 | Bull et al. |
| 6,006,206 A | 12/1999 | Smith et al. |
| 6,012,046 A | 1/2000 | Lupien et al. |
| 6,018,714 A | 1/2000 | Risen, Jr. |
| 6,018,721 A | 1/2000 | Aziz et al. |
| 6,023,280 A | 2/2000 | Becker et al. |
| 6,029,146 A | 2/2000 | Hawkins et al. |
| 6,029,147 A | 2/2000 | Horadan et al. |
| 6,035,287 A | 3/2000 | Stallaert et al. |
| 6,049,783 A | 4/2000 | Segal et al. |
| 6,052,673 A | 4/2000 | Leon et al. |
| 6,055,522 A | 4/2000 | Krishna et al. |
| 6,058,378 A | 5/2000 | Clark et al. |
| 6,061,662 A | 5/2000 | Makivic |
| 6,064,984 A | 5/2000 | Ferguson et al. |
| 6,073,104 A | 6/2000 | Field |
| 6,073,115 A | 6/2000 | Marshall |
| 6,078,914 A | 6/2000 | Redfern |
| 6,078,956 A | 6/2000 | Bryant et al. |
| 6,081,774 A | 6/2000 | de Hita et al. |
| 6,088,685 A | 7/2000 | Kiron et al. |
| 6,092,056 A | 7/2000 | Tull, Jr. et al. |
| 6,105,005 A | 8/2000 | Fuhrer |
| 6,131,082 A | 10/2000 | Hargrave, III et al. |
| 6,134,600 A | 10/2000 | Liu |
| 6,148,298 A | 11/2000 | LaStrange et al. |
| 6,173,270 B1 | 1/2001 | Cristofich et al. |
| 6,173,276 B1 | 1/2001 | Kant et al. |
| 6,178,420 B1 | 1/2001 | Sassano |
| 6,185,567 B1 | 2/2001 | Ratnaraj et al. |
| 6,195,647 B1 | 2/2001 | Martyn et al. |
| 6,226,623 B1 | 5/2001 | Schein et al. |
| 6,233,566 B1 | 5/2001 | Levine et al. |
| 6,236,972 B1 | 5/2001 | Shkedy |
| 6,236,977 B1 | 5/2001 | Verba et al. |
| 6,243,670 B1 | 6/2001 | Bessho et al. |
| 6,260,021 B1 | 7/2001 | Wong et al. |
| 6,263,321 B1 | 7/2001 | Daughtery, III |
| 6,263,335 B1 | 7/2001 | Paik et al. |
| 6,266,683 B1 | 7/2001 | Yehuda et al. |
| 6,272,474 B1 | 8/2001 | Garcia |
| 6,275,229 B1 | 8/2001 | Weiner et al. |
| 6,278,982 B1 | 8/2001 | Korhammer et al. |
| 6,282,537 B1 | 8/2001 | Madnick et al. |
| 6,285,986 B1 | 9/2001 | Andrews |
| 6,285,989 B1 | 9/2001 | Shoham |
| 6,304,858 B1 | 10/2001 | Mosler et al. |
| 6,313,854 B1 | 11/2001 | Gibson |
| 6,317,726 B1 | 11/2001 | O'Shaughnessy |
| 6,317,728 B1 | 11/2001 | Kane |
| 6,321,212 B1 | 11/2001 | Lange |
| 6,323,881 B1 | 11/2001 | Broulik et al. |
| 6,332,163 B1 | 12/2001 | Bowman-Amuah |
| 6,338,055 B1 | 1/2002 | Hagmann et al. |
| 6,338,068 B1 | 1/2002 | Moore et al. |
| 6,343,287 B1 | 1/2002 | Kumar et al. |
| 6,347,307 B1 | 2/2002 | Sandhu et al. |
| 6,349,291 B1 | 2/2002 | Varma |
| 6,356,933 B2 | 3/2002 | Mitchell et al. |
| 6,360,210 B1 | 3/2002 | Wallman |
| 6,366,908 B1 | 4/2002 | Chong et al. |
| 6,381,585 B1 | 4/2002 | Maples et al. |
| 6,381,586 B1 | 4/2002 | Glasserman et al. |
| 6,385,660 B2 | 5/2002 | Griesemer et al. |
| 6,389,413 B2 | 5/2002 | Takahashi et al. |
| 6,389,452 B1 | 5/2002 | Glass |
| 6,401,080 B1 | 6/2002 | Bigus et al. |
| 6,408,282 B1 | 6/2002 | Buist |
| 6,418,417 B1 | 7/2002 | Corby et al. |
| 6,421,653 B1 | 7/2002 | May |
| 6,424,980 B1 | 7/2002 | Iizuka et al. |
| 6,429,868 B1 | 8/2002 | Dehner, Jr. et al. |
| 6,442,545 B1 | 8/2002 | Feldman et al. |
| 6,446,110 B1 | 9/2002 | Lection et al. |
| 6,457,066 B1 | 9/2002 | Mein et al. |
| 6,480,882 B1 | 11/2002 | McAdam et al. |
| 6,489,954 B1 | 12/2002 | Powlette |
| 6,490,584 B2 | 12/2002 | Barrett et al. |
| 6,493,681 B1 | 12/2002 | Tertitski et al. |
| 6,510,406 B1 | 1/2003 | Marchisio |
| 6,516,303 B1 | 2/2003 | Wallman |
| 6,516,308 B1 | 2/2003 | Cohen |
| 6,523,022 B1 | 2/2003 | Hobbs |
| 6,556,987 B1 | 4/2003 | Brown et al. |
| 6,564,250 B1 | 5/2003 | Nguyen |
| 6,581,056 B1 | 6/2003 | Rao |
| 6,581,062 B1 | 6/2003 | Draper et al. |
| 6,598,028 B1 | 7/2003 | Sullivan et al. |
| 6,601,044 B1 | 7/2003 | Wallman |
| 6,611,825 B1 | 8/2003 | Billheimer et al. |
| 6,615,187 B1 | 9/2003 | Ashenmil et al. |
| 6,629,097 B1 | 9/2003 | Keith |
| 6,631,373 B1 | 10/2003 | Otani et al. |
| 6,633,868 B1 | 10/2003 | Min et al. |
| 7,415,436 B1 * | 8/2008 | Evelyn et al. ............... 705/37 |
| 2001/0011241 A1 | 8/2001 | Nemzow |
| 2001/0011242 A1 | 8/2001 | Allex et al. |
| 2001/0025264 A1 | 9/2001 | Deaddio et al. |
| 2001/0032217 A1 | 10/2001 | Huang |
| 2001/0042034 A1 | 11/2001 | Elliott |
| 2001/0043235 A1 | 11/2001 | Best et al. |
| 2001/0044771 A1 | 11/2001 | Usher et al. |
| 2001/0056398 A1 | 12/2001 | Scheirer |
| 2002/0002530 A1 | 1/2002 | May |
| 2002/0004777 A1 | 1/2002 | Foster et al. |
| 2002/0007335 A1 | 1/2002 | Millard et al. |
| 2002/0007358 A1 | 1/2002 | Johnson et al. |
| 2002/0013753 A1 | 1/2002 | Marks de Chabris et al. |

| | | |
|---|---|---|
| 2002/0013862 A1 | 1/2002 | Orchard et al. |
| 2002/0016762 A1 | 2/2002 | Feilbogen et al. |
| 2002/0016819 A1 | 2/2002 | Sugimoto et al. |
| 2002/0018077 A1 | 2/2002 | Powlette |
| 2002/0022956 A1 | 2/2002 | Ukranincsky et al. |
| 2002/0023053 A1 | 2/2002 | Szoc et al. |
| 2002/0026405 A1 | 2/2002 | Haar |
| 2002/0026449 A1 | 2/2002 | Azencott |
| 2002/0026462 A1 | 2/2002 | Shotton, Jr. et al. |
| 2002/0032644 A1 | 3/2002 | Corby et al. |
| 2002/0035561 A1 | 3/2002 | Archer et al. |
| 2002/0042767 A1 | 4/2002 | Kwan |
| 2002/0049666 A1 | 4/2002 | Reuter et al. |
| 2002/0054115 A1 | 5/2002 | Mack et al. |
| 2002/0059141 A1 | 5/2002 | Davies et al. |
| 2002/0065752 A1 | 5/2002 | Lewis |
| 2002/0065755 A1 | 5/2002 | Shlafman et al. |
| 2002/0069157 A1 | 6/2002 | Jordan |
| 2002/0073007 A1 | 6/2002 | Ayache |
| 2002/0078253 A1 | 6/2002 | Szondy et al. |
| 2002/0087373 A1 | 7/2002 | Dickstein et al. |
| 2002/0087454 A1 | 7/2002 | Calo et al. |
| 2002/0087455 A1 | 7/2002 | Tsagarakis et al. |
| 2002/0087457 A1 | 7/2002 | Madeley et al. |
| 2002/0099646 A1 | 7/2002 | Agarwal et al. |
| 2002/0099656 A1 | 7/2002 | Poh Wong |
| 2002/0112056 A1 | 8/2002 | Baldwin et al. |
| 2002/0123947 A1 | 9/2002 | Yuste et al. |
| 2002/0130868 A1 | 9/2002 | Smith |
| 2002/0138390 A1 | 9/2002 | May |
| 2002/0147671 A1 | 10/2002 | Sloan et al. |
| 2002/0152154 A1 | 10/2002 | Rothman et al. |
| 2002/0152156 A1 | 10/2002 | Tyson-Quah |
| 2002/0156658 A1 | 10/2002 | Selesny et al. |
| 2002/0161692 A1 | 10/2002 | Loh et al. |
| 2002/0161853 A1 | 10/2002 | Burak et al. |
| 2002/0169707 A1 | 11/2002 | Koek et al. |
| 2002/0174043 A1 | 11/2002 | Gilbert et al. |
| 2002/0174060 A1* | 11/2002 | Friedland et al. .............. 705/37 |
| 2002/0178096 A1 | 11/2002 | Marshall |
| 2002/0184132 A1 | 12/2002 | Foster |
| 2002/0184237 A1 | 12/2002 | McFeely |
| 2002/0194097 A1 | 12/2002 | Reitz |
| 2002/0194114 A1 | 12/2002 | Erdmier |
| 2003/0004942 A1 | 1/2003 | Bird |
| 2003/0009411 A1 | 1/2003 | Ram et al. |
| 2003/0018714 A1 | 1/2003 | Mikhailov et al. |
| 2003/0033212 A1 | 2/2003 | Sandhu et al. |
| 2003/0037174 A1 | 2/2003 | Lavin et al. |
| 2003/0065594 A1 | 4/2003 | Murphy |
| 2003/0066025 A1 | 4/2003 | Garner et al. |
| 2003/0066032 A1 | 4/2003 | Ramachandran et al. |
| 2003/0078869 A1 | 4/2003 | Williams |
| 2003/0088496 A1 | 5/2003 | Piotrowski |
| 2003/0093360 A1 | 5/2003 | May |
| 2003/0093362 A1 | 5/2003 | Tupper et al. |
| 2003/0093565 A1 | 5/2003 | Berger et al. |
| 2003/0105981 A1 | 6/2003 | Miller et al. |
| 2003/0115122 A1 | 6/2003 | Slater et al. |
| 2003/0126063 A1 | 7/2003 | Reuter |
| 2003/0126068 A1 | 7/2003 | Hauk et al. |
| 2003/0126069 A1 | 7/2003 | Cha |
| 2003/0126117 A1 | 7/2003 | Megiddo et al. |
| 2003/0140035 A1 | 7/2003 | Burrows |
| 2003/0149653 A1 | 8/2003 | Penney |
| 2003/0154071 A1 | 8/2003 | Shreve |
| 2003/0158949 A1 | 8/2003 | Miller et al. |
| 2003/0188255 A1 | 10/2003 | Shimizu et al. |
| 2003/0220861 A1 | 11/2003 | Broms et al. |
| 2003/0220868 A1 | 11/2003 | May |
| 2003/0233459 A1 | 12/2003 | Miller et al. |
| 2003/0236862 A1 | 12/2003 | Miller et al. |
| 2003/0236957 A1 | 12/2003 | Miller et al. |
| 2004/0064397 A1 | 4/2004 | Lynn et al. |
| 2004/0078248 A1 | 4/2004 | Altschuler |
| 2004/0103003 A1 | 5/2004 | Mayers et al. |
| 2004/0148247 A1 | 7/2004 | Miller et al. |
| 2004/0162775 A1 | 8/2004 | Winklevoss et al. |
| 2005/0060256 A1 | 3/2005 | Peterson et al. |
| 2005/0086170 A1 | 4/2005 | Rao |

FOREIGN PATENT DOCUMENTS

| | | |
|---|---|---|
| WO | WO 01/20530 | 3/2001 |
| WO | WO 01/37540 | 5/2001 |
| WO | WO 01/57716 | 8/2001 |
| WO | WO 01/59670 | 8/2001 |
| WO | WO 02/03774 | 1/2002 |
| WO | WO 02/14991 | 2/2002 |
| WO | WO 02/054189 | 7/2002 |
| WO | WO 02/056146 | 7/2002 |
| WO | WO 02/063516 | 8/2002 |
| WO | WO 02/065278 | 8/2002 |
| WO | WO 02/065286 | 8/2002 |
| WO | WO 03/012588 | 2/2003 |
| WO | WO 03/030013 | 4/2003 |
| WO | WO 03/032158 | 4/2003 |
| WO | WO 03/065256 | 8/2003 |
| WO | WO 03/102733 | 12/2003 |

OTHER PUBLICATIONS

Silverman, A new strategy for giving away your money, Wall Street Journal, D1, Oct. 6, 2004.

Czejdo, Automatic generation ontology based anntations in XML and their use in retrieval systems, Web Information Systems Engineering, 2000, Proceedings of the First International Conference, Jun. 19, 2000, p. 296.

Novell, Inc., Beginning of Viewing Information and Viewing Basic Information about a print job.

Block Trades Market Practice, Apr. 1, 2003, pp. 1-10.

Chacko, Cephalon, Inc. Taking Risk Management Gherory Seriously.

Kus, Contingent capital: just in the capital management sets a new standard; Sponsored statement.

Electronic Trading Tools.

Martin, Email Report, Issue 11, Aug. 16, 2001, printed Aug. 2, 2005.

Fast Email Extractor 4.4.

Form 10-K, United States Securities and Exchange Commission, no. date, year ending Dec. 31, 2003.

PILA, In Case Of Emergency; contingent capital.

Intellseek and Inxight Partner to Provide New Business Intelligence Solutions, www.inxight.com/news/021029_intelliseek.html, Oct. 29, 2002.

Unknown, Investigating Systems.

May, Modeling and Querying Structure and Contents of the Web, 10th International Workshop on Database & Amp; Expert Systems Applications, Sep. 1, 1999, p. 721.

Rupali et al., Phrase-based Text Representation for Managing the Web Documents.

Lam et al., Querying Web Data—The WebQA Approach.

Rising to the challenge of global STP, Euromoney Publications PLC Global Inventor, Nov. 1, 1999, pp. 51-52; Issn. 0951-3604.

STP in the Bond Market?, Wall Street & Technology, Dec. 1, 2002, p. 20.

Ericson, Softwerc releases patent-pending.

IBM Corp., Strict Read Order Control for a Queing System.

Carchiolo et al., Structuring the Web.

Witten et al., Text Mining: A New Frontier for Lossless Compression.

Fan et al., The Internet and Future Financial Markets; Industry Trend or Event, Association for Computing Machinery, Inc., Sec. 11, vol. 43; Nov. 1, 2000, p. 82; Issn: 0001-0782.

Emery, et al., The Measurement of Liquidity, Journal of Accounting Research, vol. 20, No. 2, Part 1, p. 290-303, Autumn 1982.

Calado, The Web-DL Environment for Building Digital Libraries from the Web.

Ribiero-Neto et al., Top Down Extraction of Semi-Structured Data, String Processing and Information Retrieval Symposium & amp.

Roberts, Top Priority on Bottom Line: More Companies Seeting to Manage Business Risks.

TradeWeb's STP vision, Euromoney Institutional Investor PLC, Sec. 406, vol. 34, Feb. 1, 2003, p. S6; Issn: 0014-2433.

Elkayam, Using Indexed Bonds.

Myllymaki, With Standard XML Technologies.

Hewlett-Packard, x4queview.org.

* cited by examiner

SYSTEM AND METHOD FOR IMPLEMENTING A RECURRENT BIDDING PROCESS

FIELD OF THE INVENTION

The present invention relates generally to asset sales. More particularly, the present invention relates to a system and method for implementing a recurrent bidding process in asset sales.

BACKGROUND OF THE INVENTION

For a seller with a continuously available inventory, it is certainly desirable if the seller could always dispose of the inventory at the highest price possible. However, it is not a trivial task to find a buyer or buyers willing to pay the highest prices. Ideally, the seller could hold public auctions as often as possible to sell every piece of its assets to the highest bidder. However, frequent auctions impose a significant overhead cost that tends to reduce, if not eliminate, the seller's profit margin. Alternatively, the seller can identify no more than a handful of buyers, and maintain a long-term and somewhat exclusive relationship with them. That is, the seller may choose to sell most, if not all, of its inventory to these buyers for years to come. Sales prices to these buyers may be determined through negotiations and/or biddings. Since such negotiations or biddings are too expensive to be held on a frequent basis, the sales prices are typically fixed (e.g., in a sales contract) for months or even years without any adjustment. Before a sales contract expires, the seller is legally bound to accept the sales price specified in the contract no matter how the market changes. The effect of a sales contract on the seller is therefore twofold. On the one hand, the seller is protected against risk of losses if the market price plummets. On the other hand, the seller also gives up the potential of additional profits should the market price soar through the roof. Sometimes, a sales contract that under-performs the market may put a seller company in a disadvantaged position against its competitors. For example, due to an unfortunate timing of contract negotiation (e.g., in a low-demand period), a company may later find itself locked into a sales contract with a price that is substantially below the competitors' prices. The company may then face a dilemma of either breaching the contract and incur a penalty or swallowing the pains of watching the competitors growing strong. Although, for a few standard or widely-traded commodities (e.g., oil, electricity, pork-bellies, or orange juice), it may be possible to contract a floating price that is tied to a market index, no reliable reference of market price exists for most assets or merchandise.

A buyer faces a similar problem as well. A buyer can either negotiate an acceptable purchase price with potential sellers, or select, through a bidding process, a seller who offers the lowest price. Since frequent negotiations or biddings are impracticable for a buyer with continuing acquisition needs, the buyer is also likely to enter into one or more agreements that lock in the purchase prices for a relatively long time. As a result, the buyer may also become isolated from the market and cannot benefit from any price drop during the term of the contract.

Take the sale of consumer debts for an example. A typical credit company may have thousands or even millions of cardholders, many of which maintain a revolving balance (i.e., a debt) on their credit accounts. While these debts are a major source of income for the credit company, they also pose a substantial risk as it is inevitable that some of the cardholders lack the ability to repay their debts and will eventually file for bankruptcy (e.g., Chapter 7 or Chapter 13 bankruptcy). As a result, a typical card issuer may find itself in possession of a constant supply of bankruptcy accounts (or bad debts) which have to be disposed of on a regular basis. Typically, the credit company sells the bankruptcy accounts to consumer debt buyers for a fraction of the accounts' face value. Just like other sellers with a continuously available inventory, it is common practice for such a credit company to select a buyer through a bidding process and then enter into an annual (or even longer-term) contract with the buyer. During the contract term, the buyer will continue purchasing the credit company's entire portfolio of bankruptcy accounts at a fixed price as specified in the contract. The pricing of the bankruptcy accounts, though only pennies on a dollar, can be profoundly sensitive to various factors. As such, the market price of the bankruptcy accounts tends to fluctuate substantially within a year, although there is no reliable pricing index to implement a floating price. When a credit company sells a large volume of bankruptcy accounts on a year-round basis, even a small change in the actual sales price can substantially affect the credit company's recovery from the bad debts. Therefore, compared to annual sales contracts, the credit company may prefer a sales process that affords more exposure to the market and/or more control in pricing.

In view of the foregoing, it would be desirable to provide an asset sales solution which overcomes the above-described deficiencies and shortcomings.

SUMMARY OF THE INVENTION

One embodiment of the present invention comprises a method for implementing a recurrent bidding process to dispose of a portfolio of consumer debts. The method may comprise the steps of: offering the portfolio of consumer debts in an initial bidding among a plurality of potential buyers to identify a first buyer and a second buyer, wherein the first buyer is the highest bidder in the initial bidding and is allocated a first portion of the portfolio, and wherein the second buyer is the next highest bidder in the initial bidding and is allocated a second portion of the portfolio; maintaining the allocation of the portfolio of consumer debts between the first buyer and the second buyer for a first time period; designating a portion of the portfolio as an at-risk volume for a second time period; offering the at-risk volume in a second bidding between the first buyer and the second buyer, wherein the highest bidder in the second bidding is allocated the at-risk volume; and maintaining the resulting allocation of the portfolio of consumer debts between the first buyer and the second buyer for the second time period.

Another embodiment of the present invention comprises a method for implementing a recurrent bidding process for a seller to dispose of an inventory of assets. The method may comprise the steps of: offering the inventory of assets in an initial bidding among a plurality of potential buyers to select a limited number of exclusive buyers; allocating, for a first time period, the inventory of assets to the limited number of exclusive buyers based at least in part on bidding prices in the initial bidding; designating a portion of the inventory of assets as an at-risk volume for a second time period; and offering the at-risk volume in a second bidding among the limited number of exclusive buyers, wherein one or more winning bidders in the second bidding are allocated the at-risk volume for the second time period.

Yet another embodiment of the present invention comprises a method for implementing a recurrent bidding process for a buyer to purchase assets to fulfill an acquisition portfolio. The method may comprise the steps of: offering the acquisition portfolio in an initial bidding among a plurality of potential sellers to select a limited number of exclusive sellers; allocating, for a first time period, the acquisition portfolio to the limited number of exclusive sellers based at least in part on bidding prices in the initial bidding; designating a portion of the acquisition portfolio as an at-risk volume for a second time period; and offering the at-risk volume in a second bidding among the limited number of exclusive sellers, wherein one or more winning bidders in the second bidding are allocated the at-risk volume for the second time period.

The present invention will now be described in more detail with reference to exemplary embodiments thereof as shown in the accompanying drawings. While the description below makes reference to exemplary embodiments, it should be understood that the present invention is not limited thereto. Those of ordinary skill in the art having access to the teachings herein will recognize additional implementations, modifications, and embodiments, as well as other fields of use, which are within the scope of the present invention as described herein, and with respect to which the present invention may be of significant utility.

BRIEF DESCRIPTION OF THE DRAWINGS

The purpose and advantages of the present invention will be apparent to those of skill in the art from the following detailed description in conjunction with the appended drawings in which like reference characters are used to indicate like elements.

Reference will now be made in detail to the present embodiments of the invention, examples of which are illustrated in the accompanying drawings.

DETAILED DESCRIPTION OF THE INVENTION

In the description that follows, the word "asset" refers to any of a wide variety of property or merchandise that may be bought or sold. An asset may comprise, without limitation, a piece of real or personal property, a contract, an account, a debt, a security or stock, a legal interest, a product or service, or any combination thereof. The word "inventory" refers to one or more assets that a seller offers or makes available for sale at a particular time. At different times, the content in a seller's inventory may vary. A seller's inventory does not have to consist of the same number or type of assets at all times. The term "acquisition portfolio" refers to one or more assets that a buyer seeks to acquire or purchase at a particular time. Similarly, a buyer's acquisition portfolio does not have to consist of the same number or type of assets at all times.

The word "seller" may refer to an individual person, a group of people, an organization (e.g., a corporation or a partnership), a government entity, or any legal entity that can enter into binding contracts with another legal entity. A seller may act for itself or as an agent or intermediary for another entity. The same is true with the word "buyer."

The word "winning bidder" (or "highest bidder") is to be interpreted within a bidding context and does not always refer to a bidder who offers the highest price. For example, when offering to sell an asset for the highest possible price, the word "winning bidder" may refer to a bidder who offers to buy the asset at the highest price. However, when offering to buy an asset, the "winning bidder" may refer to a bidder who offers to sell the asset at the lowest price. Further, for assets that are not priced or valued solely based on a dollar amount, the "winning bidder" (or "highest bidder") may refer to one who makes the most desirable offer (e.g., a best combination of dollar amount price and contract contingencies).

Figure 1:
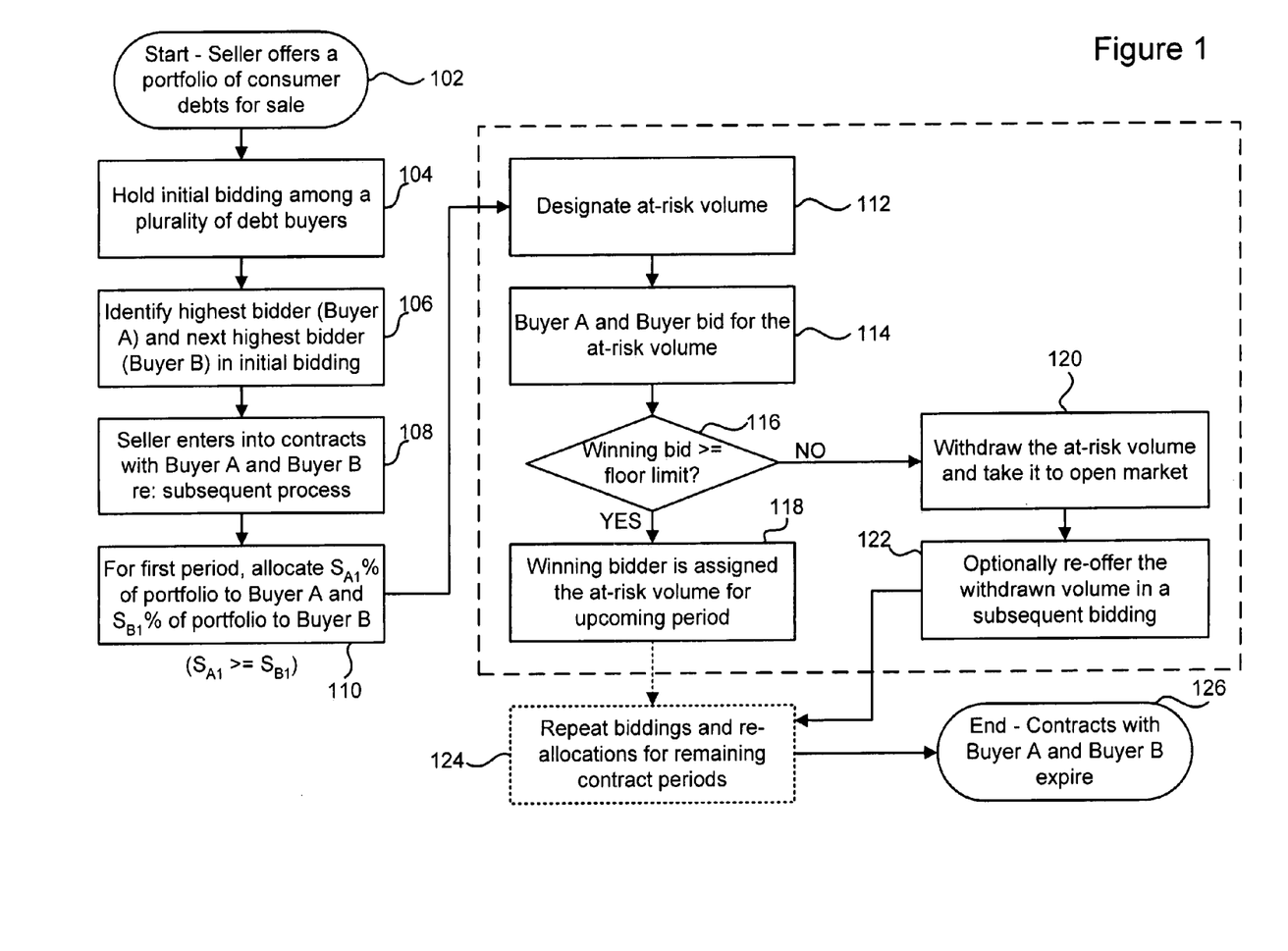
FIG. 1 is a flow chart illustrating an exemplary recurrent bidding process in sales of consumer debts in accordance with an embodiment of the present invention.

Referring to FIG. 1, there is shown a flow chart illustrating an exemplary recurrent bidding process in sales of consumer debts in accordance with an embodiment of the present invention.

The exemplary process starts in step 102 where a seller may offer a portfolio of consumer debts for sale. According to one embodiment, the seller may be a credit company, and the portfolio of consumer debts may comprise bankruptcy accounts that the credit company seeks to dispose of on a regular basis. That is, the seller may try to charge off these uncollectible debts by selling them at a fraction of their face value.

In step 104, an initial bidding may be held among a plurality of potential debt buyers. In the initial bidding, the seller may invite any debt buyer who might be interested to bid on the portfolio of consumer debts. There may be any number of, preferably no fewer than three, bidders or potential buyers to participate in the initial bidding. The initial bidding may take any of a variety of forms, private or public, for the bidders to compete for a purchase right of the seller's portfolio of consumer debts (or a portion thereof). Though the dollar amount price is typically a dominant factor in comparing the bids, other factors may be taken into consideration. For example, the bidders may be encouraged to submit contract terms or conditions which the seller might find attractive. The bidders may also offer other in-kind incentives in addition to or in combination with their bid prices.

In step 106, two of the highest bidders in the initial bidding may be identified. For illustration purposes, the highest bidder (or winning bidder) is referred to herein as "Buyer A," and the next highest bidder (or runner up) may be refer to as "Buyer B." Therefore, the initial bidding essentially resembles a two-tier auction. It should be noted that, although only two of the highest bidders are selected in this example, three or more highest bidders may be selected without any significant modification to the recurrent bidding process described herein.

In step 108, the seller may enter into contracts with Buyer A and Buyer B respectively regarding their purchase of the seller's portfolio of consumer debts. Of course, these contracts may be formed prior to or during the initial bidding. For example, the seller may enter into provisional contracts with each of the potential buyers in the initial bidding, wherein the provisional contracts may bind whoever turn out to be the two highest bidders but become void with respect to the other bidders. The provisional contracts may lay out the details of the recurrent bidding process, for example, as described herein in connection with FIG. 1. Alternatively, the details of the respective contracts may be disclosed in the formal contracts only after the two highest bidders have been identified. Among other things, the contracts may specify, for example, a contract length divided into two or more time periods as well as rules for re-bidding and re-allocation of the seller's portfolio. The specified time periods may include at least a first time period and a second time period.

In step 110, for the first time period, a first portion (e.g., $S_{A1}\%$) of the seller's portfolio may be allocated to Buyer A, and a second portion (e.g., $S_{B1}\%$) of the seller's portfolio may be allocated to Buyer B. The first and the second portions may or may not account for the seller's entire portfolio of consumer debts. In one embodiment, for example, the seller may choose to reserve a portion (e.g., 10%) of the portfolio for itself. The seller may dispose of the reserved portion at its own discretion. For example, the seller may use the reserved portion in market tests or award it to a winner in a re-bidding as will be described below. Typically, Buyer A, the winning bidder in the initial bidding, is assigned a larger (or better) share of the seller's portfolio than Buyer B, the runner up in the initial bidding. For example, Buyer A may be assigned 80% of the seller's portfolio while Buyer B may have only 20%. Allocations of the seller's portfolio between Buyer A and Buyer B for the first period and/or any subsequent time period may be specified in the contracts to some extent. The specific percentages may be either fixed in the contracts or determined according to rules or algorithms provided in the contracts.

According to embodiments of the present invention, an allocation of the seller's portfolio of consumer debts between Buyer A and Buyer B may be on a quantitative basis, a qualitative basis, or both. For example, instead of or in addition to the above-described allocation of the consumer debts by percentage or by volume, the seller's portfolio may be assigned to Buyer A and Buy B based on a quality grading of the consumer debts. Even at a same or comparable face value, different consumer debts or bankruptcy accounts may have different value depending on the debtors' willingness and future ability to repay the underlying debts. Accordingly, the seller's portfolio of consumer debts may be evaluated and graded. Certain "fresh accounts" or "preferred accounts" may be assigned a higher grade because the debtors have exhibited some degree of willingness to repay. Other accounts may be assigned a lower grade since there is less chance of recovery. Therefore, for the first time period, Buyer A may be allocated more "preferred accounts" than Buyer B. Also, in the re-biddings as described below, re-allocation of the seller's portfolio may also be based on or at least take into account the quality grading of the consumer debts.

In step 112, at least a portion of the seller's portfolio may be designated as "at-risk" for the second time period, wherein this designated portion may be referred to as an "at-risk volume." That is, regardless of the allocation of the seller's portfolio during the first time period, the at-risk volume will be re-allocated in a re-bidding process as will be described in detail below. The at-risk volume may be designated a number of ways. In one embodiment, for example, the at-risk volume may be a predetermined percentage or volume taken out of whoever had a larger share in the first time period, in this case, Buyer A. Thus, a portion of the $S_{A1}\%$ of the seller's portfolio that was allocated to Buyer A may become the at-risk volume for the second time period. In another embodiment, for each time period, a minimum percentage or volume of the seller's portfolio may be promised to the two buyers in their contracts. Then, for each time period, the remaining portion of the seller's portfolio that is not promised to the buyers may be designated as at risk. In another alternative embodiment, a predetermined percentage (e.g., 50%) may be taken out of each buyer's current share and be designated as at risk for an upcoming time period. It is contemplated that many other variations exist in designating an at-risk volume as will be appreciated by those skilled in the art.

In step 114, Buyer A and Buyer B may bid for the at-risk volume that has been designated in step 112 above. Typically, the designation of and bidding for the at-risk volume may take place close to an end of a current time period. For example, steps 112 and 114 may be implemented in the last week of the first time period. The bidding process in step 114 may be referred to as a "re-bidding" which may be carried out in any format that allows two buyers to compete for the same asset.

In step 118, the winning bidder in the re-bidding of step 114 may be assigned the at-risk volume for the upcoming time period (e.g., the second time period). Alternatively, the contracts may provide that a winning bidder in the re-bidding takes a percentage (e.g., 80%) of the at-risk volume while the losing bidder takes the rest (e.g., 20%) of the at-risk volume.

In a preferred embodiment, however, the seller may choose to safeguard its own interest by imposing a "floor limit" in the re-bidding. That is, the seller may determine a lowest acceptable price as the floor limit for the at-risk volume. The floor limit is typically determined based on, for example, current market conditions and/or historical market data. In step 116, it may be determined whether the winning bid in the re-bidding of step 114 equals or exceeds the floor limit. If so, the winning bidder may be assigned the at-risk volume in step 118. If the winning bid offers a lower price than the floor limit, then, in step 120, the seller may withdraw the at-risk volume from the buyers and dispose of it through other channels. That is, as a penalty for failing to meet the floor limit, neither Buyer A nor Buyer B can enjoy the at-risk volume for the upcoming time period. Instead, the seller may take the at-risk volume to the open market. Since the floor limit is typically established with consideration of a current market price, it is expected that the seller will have no difficulty finding other potential buyers.

In step 124, the biddings for and reallocations of the seller's portfolio as described in steps 112-122 above may be repeated for the remaining contract periods. The exemplary recurrent bidding process may end in step 126 upon expiration of the contracts with Buyer A and Buyer B.

The above-described recurrent bidding process offers benefits to both the seller and the buyers. It helps the seller to keep a desirable level of sales price while enjoying some upside exposure to the market. Here, unlike typical sales contracts, the allocation of the seller's portfolio between the two buyers does not remain static for the entire contract term. Such allocation is fixed (through initial bidding or re-bidding) for only one period at a time. To win a greater share of the seller's business in an upcoming period, each buyer must strive to offer a competitive price. Furthermore, the floor limit ensures that a winning bid does not under-perform the market. On the other hand, for each buyer, the recurrent bidding process provides a fair and transparent mechanism to compete for the seller's business. If a buyer loses in one re-bidding, it may still have an opportunity to beat the other buyer and win the lost volume back in a subsequent time period. In addition, the buyers may also adjust their bids based on current market conditions.

Figure 2:
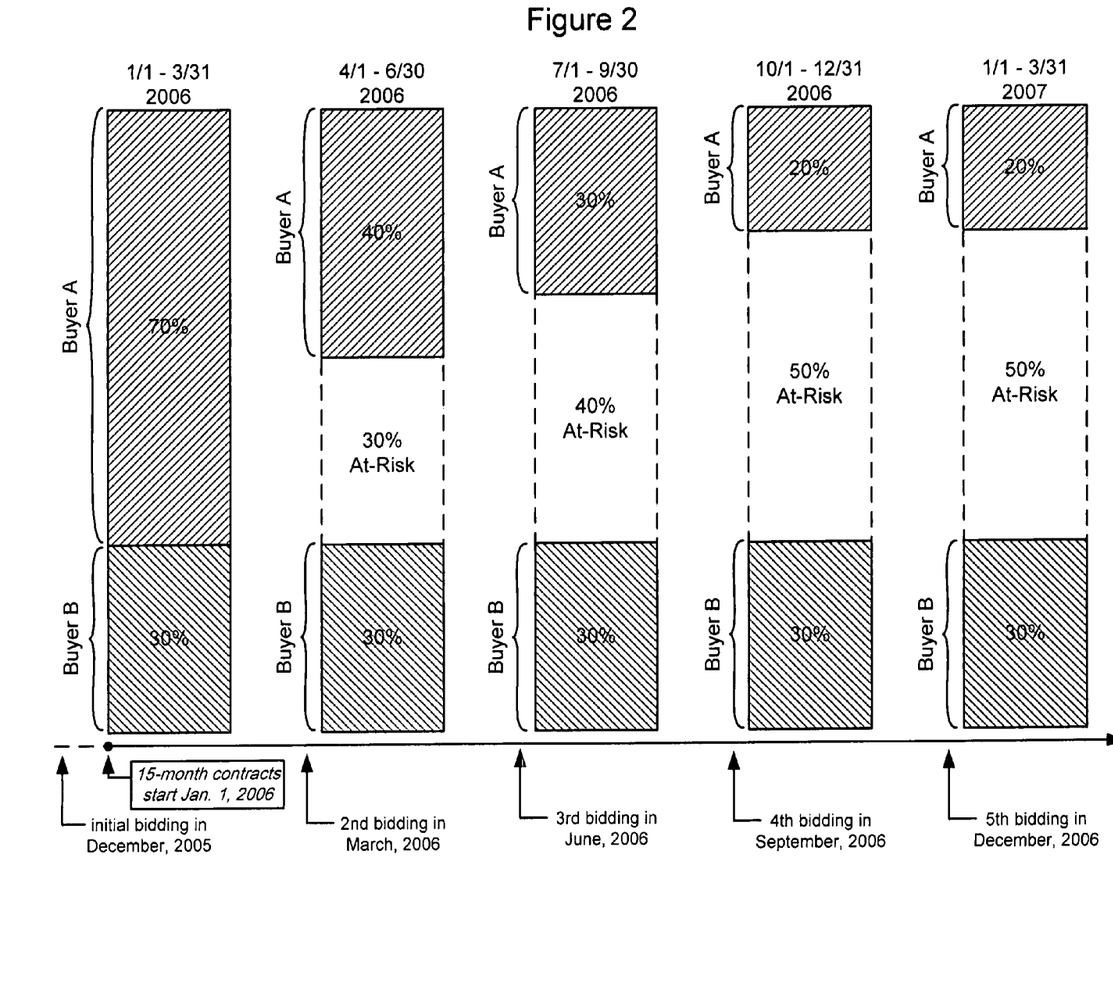
FIG. 2 shows an exemplary designation of at-risk volume in a recurrent bidding process in accordance with an embodiment of the present invention.
Figure 3:
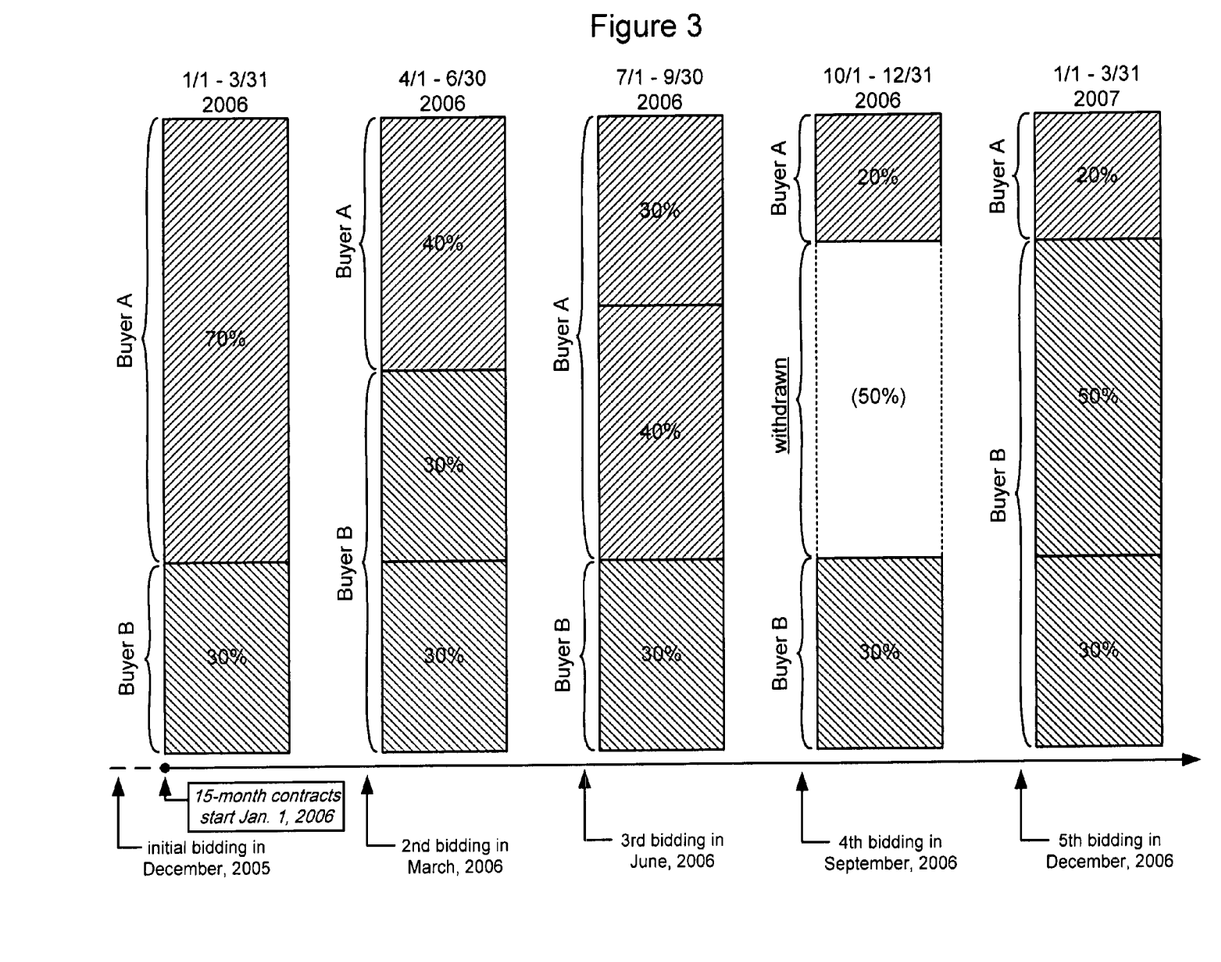
FIG. 3 is a diagram illustrating an exemplary asset allocation scenario between two buyers in a recurrent bidding process in accordance with an embodiment of the present invention.

The dynamics of the recurrent bidding process is further illustrated in FIGS. 2 and 3.

FIG. 2 shows an exemplary designation of at-risk volume in a recurrent bidding process in accordance with an embodiment of the present invention. For illustration purposes, it is assumed the seller here also offers for sale a portfolio of consumer debts just like the seller described in connection with FIG. 1. In this embodiment, the recurrent bidding process may include an initial bidding and a 15-month contract term that starts, for example, on Jan. 1, 2006. The 15-month may be divided into five time periods (i.e., five quarters) with the last one ending on Mar. 31, 2007. Sometime prior to Jan. 1, 2006, for example, in December 2005, the seller may offer its portfolio in an initial bidding among potential debt buyers. As described in FIG. 1, a winning bidder Buyer A and a runner-up Buyer B may be identified based on their bidding prices. Then, Buyer A and Buyer B may each enter into a 15-month contract with the seller.

Buyer A's contract may, for example, specify the following:

"Seller shall sell approximately seventy (70%) percent of its portfolio of Accounts (i.e., bankruptcy accounts) to Buyer A in the first calendar quarter of 2006. Thereafter, Seller reserves the right, based upon Buyer A's proposed Purchase Price in the then current calendar quarter, to sell Buyer A an amount of Accounts ranging from zero (0%) percent up to a maximum of one hundred (100%) percent for the then current quarter, provided however, that as long as Buyer A's proposed Purchase Price equals or exceeds the Floor Limit, Buyer A shall be awarded (i) at least 40% of Seller's available Accounts in the second quarter of 2006, (iii) at least 30% of Seller's available Accounts in the third quarter of 2006, and (iv) at least 20% of Seller's available Accounts in both the fourth quarter of 2006 and the first quarter of 2007."

Buyer A's contract may further specify:

"During the Term, Seller will sell Accounts only to Buyer A and to the other purchaser (i.e., Buyer B) selected by Seller as part of the initial bid process."

Similarly, Buyer B's contract may specify that "as long as Buyer B's proposed Purchase Price equals or exceeds the Floor Limit, Buyer B shall be awarded at least 30% of Seller's available Accounts in each calendar quarter during the Term."

Both contracts may further specify an at-risk volume for each quarter subsequent to the first quarter of 2006. The contracts may give the seller the discretion of designating the at-risk volume for each quarter or lay out rules or mechanisms for determining the at-risk volumes. Alternatively, as illustrated in FIG. 2, the at-risk volumes may be fixed in the contracts as predetermined percentage of the seller's portfolio. For example, in the second quarter of 2006, 30% of the seller's portfolio will be at risk; in the third quarter of 2006, 40% will be at risk; in both the fourth quarter of 2006 and the first quarter of 2007, 50% will be at risk.

In FIG. 2, five sets of vertical bars illustrate the contract-specified minimum allocations for Buyer A and Buyer B as well as at-risk volumes in each quarter. A 16-month timeline illustrates the initial bidding period (in December 2005) and the 15-month (or 5-quarter) contract term. Four quarterly biddings (i.e., re-biddings) are held, for example, typically in the third month of each quarter in 2006.

Based on the contract illustrated in FIG. 2, FIG. 3 shows a diagram illustrating an exemplary asset allocation scenario between the two buyers (Buyer A and Buyer B) in accordance with an embodiment of the present invention. Since Buyer A is the winner in the initial bidding, it may be assigned 70% of the seller's portfolio during the first quarter of 2006, while Buyer B, the runner-up in the initial bidding, may be assigned 30%. However, such allocation only lasts for three months. Buyer B might win the second bidding held in March 2006 and snatch from Buyer A the 30% at-risk volume designated for the second quarter of 2006. Thus, Buyer B may be assigned 60% of the seller's portfolio for the second quarter of 2006, while Buyer A is left with only 40%. For the third quarter of 2006, the designated at-risk volume may be 40% of the seller's portfolio. If Buyer A makes a com-back and outbids Buyer B in the third bidding held in June 2006, Buyer A may restore its share to 70%, just like the allocation in the first quarter of 2006. For the fourth quarter of 2006, the designated at-risk volume may be 50% of the seller's portfolio. This time, as illustrated in FIG. 3, neither Buyer A nor Buyer B is the winner since the highest bid does not equal or exceed a floor limit imposed by the seller. As a result, the seller may withdraw the 50% and dispose of it in open market (i.e., to third parties). Thus, Buyer A and Buyer B are only allocated 20% and 30%, respectively, of the seller's portfolio. For the first quarter of 2007, the designated at-risk volume may again be 50% of the seller's portfolio. Having learned their lessons from the previous quarter, Buyer A and Buyer B may offer more competitive prices and manage to at least meet the current floor limit set by the seller. Buyer B may outbid Buyer A in the fifth bidding held in December 2006 and grab 80% of the seller's portfolio for the last quarter of the contract term.

From the illustration in FIG. 3, it may be appreciated that the allocation of the seller's portfolio between Buyer A and Buyer B may change dynamically depending on the buyers' performance in the recurrent biddings. In this example, Buyer A starts as the dominant player with 70% of the seller's portfolio. However, Buyer B manages to upset the allocation at least twice and enjoys a share of 80% at the end of the contract term. Compared with the first quarter of 2006, the allocation of the seller's portfolio between Buyer A and Buyer B becomes almost reversed at the end of the contract term.

Figure 4:
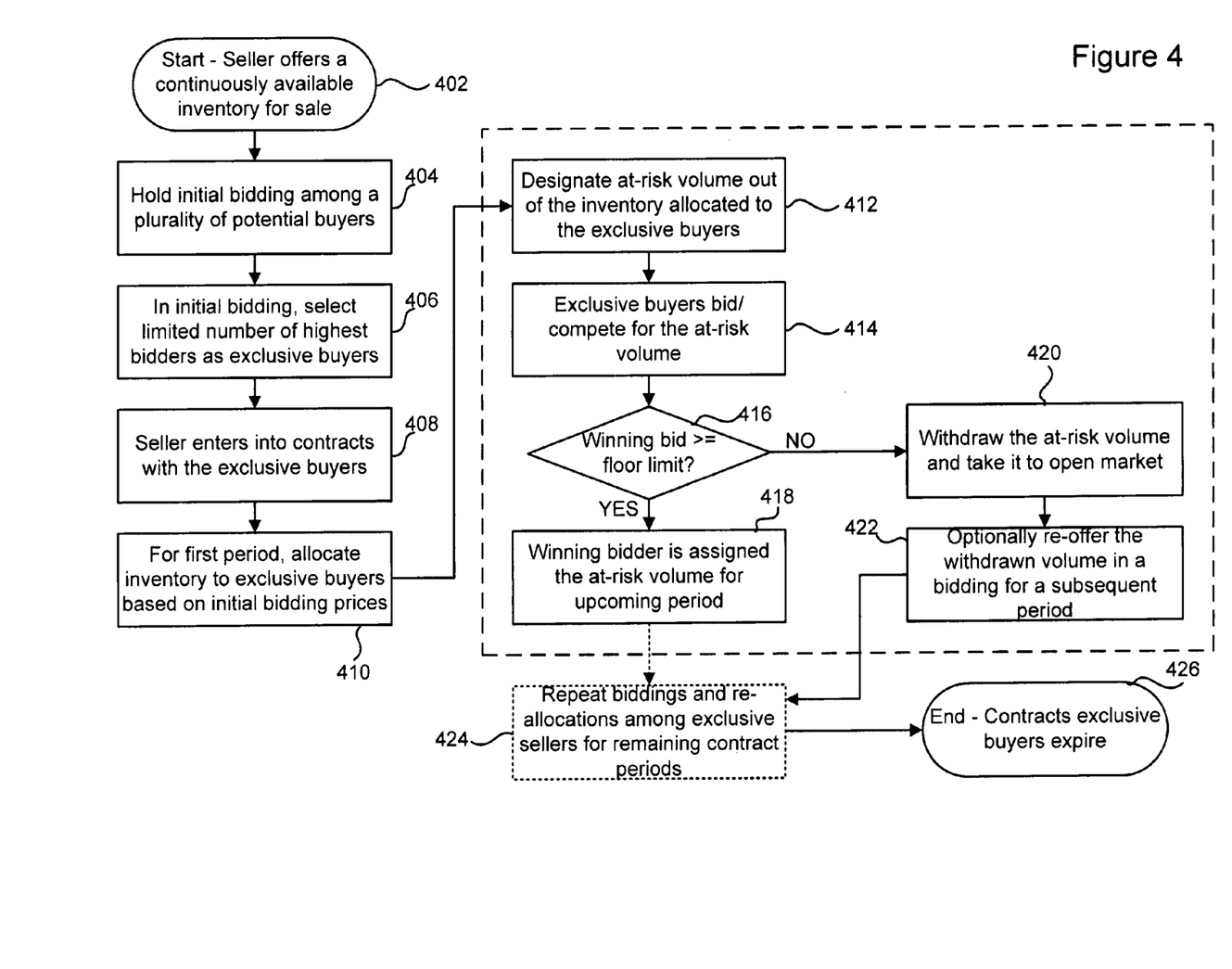
FIG. 4 is a flow chart illustrating an exemplary method of implementing a recurrent bidding process to sell assets in accordance with an embodiment of the present invention.

FIG. 4 is a flow chart illustrating an exemplary method of implementing a recurrent bidding process to sell assets in accordance with an embodiment of the present invention. This exemplary method may be applicable to the sale of any asset.

The exemplary method starts in step 402 wherein a seller may offer a continuously available inventory for sale.

In step 404, an initial bidding may be held among a plurality of potential buyers. The initial bidding, as well as re-biddings described below, may be held by the seller or through an intermediary or an agent. The potential buyers may be notified of the offer for sale and be provided with a description of the inventory of assets as well as contractual obligations for winners in the initial bidding.

In step 406, a limited number of highest bidders may be selected as exclusive buyers. Selection of the exclusive buyers is primarily based on the bidding prices or offers submitted by the potential buyers. Preferably, two or three exclusive buyers may be selected although a greater number of exclusive buyers may also be selected without any fundamental change to the recurrent bidding process illustrated herein.

In step 408, the seller may enter into contracts with the limited number of exclusive buyers. The contracts may have already become binding as soon as the exclusive buyers are definitively identified in step 406. As such, what takes place in step 408 may be a formal confirmation or ratification of the contracts' terms and conditions which have already been made known to the potential buyers prior to the initial bidding. One of the provisions may be an allocation of the seller's inventory among the exclusive buyers for a first time period in the contract term. One or more time periods in addition to the first time period may also be provided.

In step 410, the seller's inventory may be allocated to the exclusive buyers according to the contracts' provisions. This initial allocation is typically based on the initial bidding prices. For example, the winning bidder in the initial bidding may be assigned the largest share of the seller's inventory, and the runner-ups may be assigned progressively smaller shares. This initial allocation lasts only through the end of the first time period.

In step 412, a percentage or a volume of the seller's inventory, up to the entire (100%) of the inventory, may be designated as at risk for the next time period. In the contracts, each exclusive buyer may have been promised a minimum share of the seller's inventory for one or more time periods. If that is the case, the exclusive buyers may be guaranteed their minimum shares in the corresponding time period. However, the rest of the inventory may become "fair game" among the exclusive buyers.

In step 414, the exclusive buyers may bid or compete for the designated at-risk volume, from which one or more highest or winning bidders may emerge. In one embodiment, if there is a tie between two or more exclusive buyers, there may be multiple winning bidders. Even if there is not a tie, two or more of the highest bidders may be selected in the re-bidding to share the at-risk volume. In another embodiment, a single highest bidder may have to be identified and the bidding may not end until such winner is identified. The winning bidder(s) may then, in step 418, be assigned (or share, if multiple winners) the at-risk volume for the corresponding time period.

In steps 416 and 420, however, the seller may choose to impose a floor limit for the re-bidding in step 414. If, in step 416, it is determined that the winning bid does not equal or exceed the floor limit, the seller will not assign the at-risk volume to any of the exclusive buyers but may take it to the open market. In step 422, the withdrawn volume may optionally be re-offered in a subsequent bidding among the exclusive buyers. With the floor limit, only when the winning bid in step 414 is no lower than the floor limit, will the winning bidder(s) be assigned the at-risk volume in step 418.

It is contemplated that a typical contract in accordance with embodiments of the present invention may have more than two time periods for which re-biddings may be held. Therefore, in step 424, the bidding and re-allocation of the seller's inventory as described in steps 412-422 above may be repeated for any remaining time period(s) in the contract term.

In step 426, the exemplary method ends when the contracts with the exclusive buyers expire.

Figure 5:
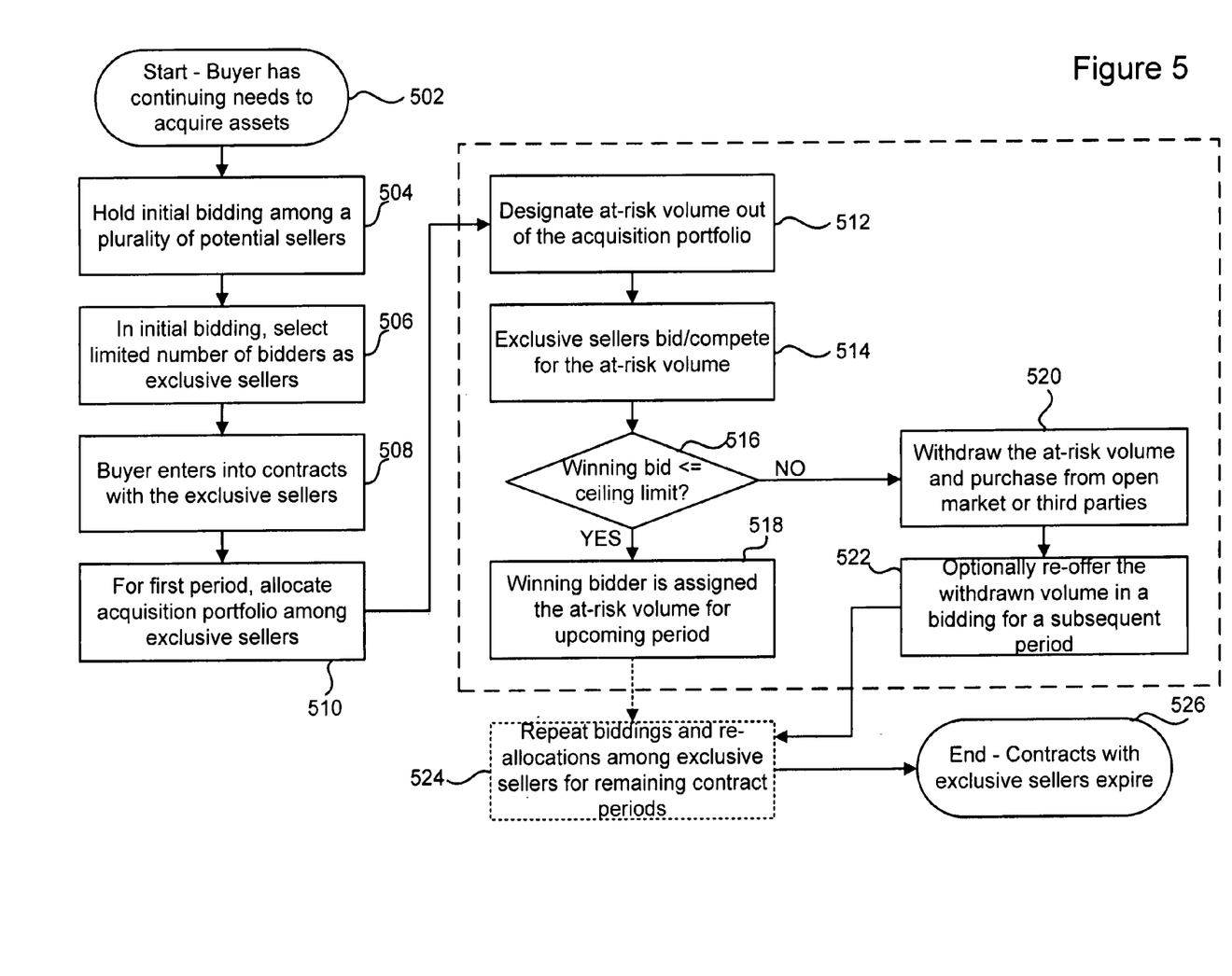
FIG. 5 is a flow chart illustrating an exemplary method of implementing a recurrent bidding process to buy assets in accordance with an embodiment of the present invention.

FIG. 5 is a flow chart illustrating an exemplary method of implementing a recurrent bidding process to buy assets in accordance with an embodiment of the present invention. This exemplary method may be applicable to the purchase of any asset.

The exemplary method starts in step 502 wherein a buyer may have continuing needs to acquire certain assets.

In step 504, an initial bidding may be held among a plurality of potential sellers. The initial bidding, as well as re-biddings described below, may be held by the buyer or through an intermediary or an agent. The potential sellers may be notified of the offer to buy and be provided with a description of the buyer's acquisition portfolio (i.e., shopping list) as well as contractual obligations for winners in the initial bidding.

In step 506, a limited number of winning bidders may be selected as exclusive sellers. Selection of the exclusive sellers is primarily based on the bidding prices or offers submitted by the potential sellers. Preferably, two or three exclusive sellers may be selected although a greater number of exclusive sellers may also be selected without any fundamental change to the recurrent bidding process illustrated herein.

In step 508, the buyer may enter into contracts with the limited number of exclusive sellers. The contracts may have already become binding as soon as the exclusive sellers are definitively identified in step 506. As such, what takes place in step 508 may be a formal confirmation or ratification of the contracts' terms and conditions which have already been made known to the potential sellers prior to the initial bidding. One of the provisions may be an allocation of the buyer's acquisition portfolio among the exclusive sellers for a first time period in the contract term.

In step 510, the buyer's acquisition portfolio may be allocated to the exclusive sellers according to the contracts' provisions. This initial allocation is typically based on the initial bidding prices. For example, the winning bidder in the initial bidding may be assigned the largest share of the buyer's acquisition portfolio, and the runner-ups may be assigned progressively smaller shares. This initial allocation lasts only through the end of the first time period.

In step 512, a percentage or a volume of the buyer's acquisition portfolio, up to the entire (100%) of the portfolio, may be designated as at risk for the next time period. In the contract, each exclusive seller may have been promised a minimum share of the buyer's acquisition portfolio for one or more time periods. If that is the case, the exclusive sellers may be guaranteed their minimum shares in the corresponding time period. However, the rest of the acquisition portfolio may become "fair game" among the exclusive sellers.

In step 514, the exclusive sellers may bid or compete for the designated at-risk volume, from which one or more winning bidders may emerge. In one embodiment, if there is a tie between two or more exclusive sellers, there may be multiple winning bidders. In another embodiment, a single winning bidder may have to be identified and the bidding may not end until such winner is identified. The winning bidder(s) may then, in step 518, be assigned the at-risk volume for the corresponding time period.

In steps 516 and 520, however, the buyer may choose to impose a ceiling limit for the bidding in step 514. If, in step 516, it is determined that the winning bid is higher than the ceiling limit, the buyer will not assign the at-risk volume to any of the exclusive sellers but may take it to the open market. In step 522, the withdrawn volume may optionally be re-offered in a subsequent bidding among the exclusive sellers. With the ceiling limit, only when the winning bid in step 514 is no higher than the ceiling limit, will the winning bidder(s) be assigned the at-risk volume in step 518.

It is contemplated that a typical contract in accordance with embodiments of the present invention may have more than two time periods for which re-biddings may be held. Therefore, in step 524, the bidding and re-allocation of the buyer's acquisition portfolio as described in steps 512-522 above may be repeated for any remaining time period(s) in the contract term.

In step 526, the exemplary method ends when the contracts with the exclusive sellers expire.

Figure 6:
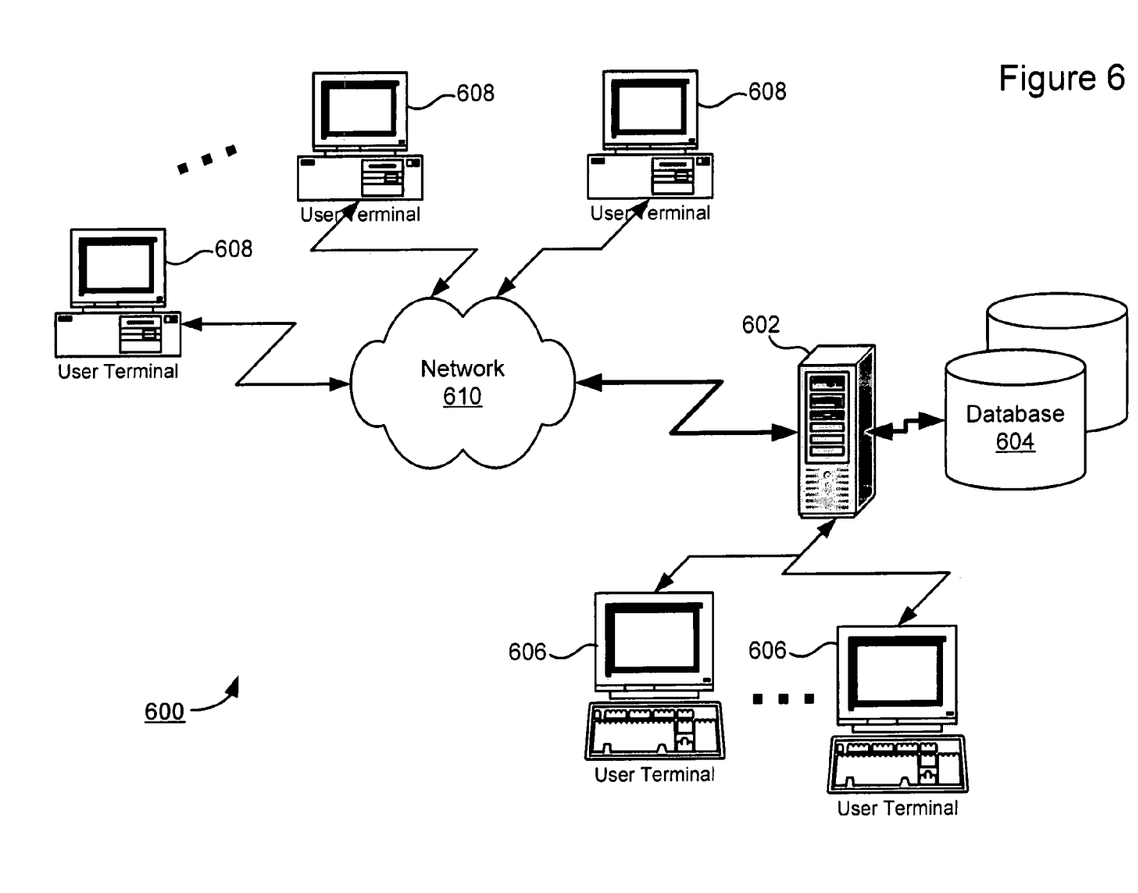
FIG. 6 is a block diagram illustrating an exemplary system for implementing a recurrent bidding process in accordance with an embodiment of the present invention.

FIG. 6 is a block diagram illustrating an exemplary system 600 for implementing a recurrent bidding process in accordance with an embodiment of the present invention. The system 600 may comprise a processor unit 602, such as a UNIX server or personal computer (PC) or similar computing device that is capable of data manipulation, logic operation, and network communications. The system 600 may also comprise one or more databases 604 coupled to the processor unit 602. The database(s) 604 may store information related to, for example, a seller's inventory of assets (or a buyer's acquisition portfolio), sales contracts entered into with exclusive buyers (or sellers), and bidding prices or offers. The system 600 may further comprise user terminals 606 that are coupled locally to the processor unit 602, as well as remote user terminals 608 that are coupled to the processor unit 602 remotely via a network 610. The local user terminals 606 and/or the remote user terminals 608 may have client programs to securely communicate with the processor unit 602, either for bidders to receive notification, submit bids and receive confirmation, or for a bidding host (e.g., seller of an inventory) to enter asset information, contract information, market information and bidding rules, or for an administrator to manage the system 600.

According to one embodiment of the present invention, the system 600 may be employed to host online biddings in an asset sale or purchase with a recurrent bidding process. The online biddings may not only include an initial bidding among a large number of bidders, but may also include subsequent re-biddings among exclusive bidders who have won the initial bidding. Using the user terminals (606 and/or 608), bidders may participate in public biddings similar to most auctions found on eBay®, wherein each bidder is aware of these other participants' offers. Alternatively, the bidders may submit their own offers without any idea of the other participants' offers. The processor unit 602 may facilitate both public or private biddings as well as any other bidding format. It may collect all the bids, verify them against bidding rules, compare and/or rank them, apply limitations or restrictions imposed by the bidding host, and select one or more winners. The outcome of a bidding as well as the resulting re-allocation of assets may then be communicated to the bidders via user terminals (606 and/or 608) and recorded in the database(s) 604.

While the foregoing description includes many details and specificities, it is to be understood that these have been included for purposes of explanation only, and are not to be interpreted as limitations of the present invention. It will be apparent to those skilled in the art that other modifications to the embodiments described above can be made without departing from the spirit and scope of the invention. Accordingly, such modifications are considered within the scope of the invention as intended to be encompassed by the following claims and their legal equivalents.

The invention claimed is:

1. A computer-implemented method using a computer system having a computer processor and a database for implementing a recurrent bidding process to dispose of a portfolio of consumer debts stored in the database, the method comprising the steps of:

offering the portfolio of consumer debts in an initial bidding among a plurality of potential buyers;

identifying, using the computer processor, a first buyer and a second buyer from the plurality of potential buyers, wherein the first buyer is the highest bidder in the initial bidding and the second buyer is the next highest bidder in the initial bidding;

selecting the identified buyers as exclusive buyers and entering into a first sales contract with the first buyer allocating a first portion of the portfolio to the first buyer and entering into a second sales contract with the second buyer allocating a second portion of the portfolio to the second buyer;

maintaining the allocation of the portfolio of consumer debts between the first buyer and the second buyer for a first time period;

designating a portion of the portfolio as an at-risk volume for a second time period;

offering the at-risk volume in a second bidding between the first buyer and the second buyer, wherein the highest bidder in the second bidding is selected through operation of the computer processor and is allocated the at-risk volume; and maintaining the resulting allocation of the portfolio of consumer debts between the first buyer and the second buyer for the second time period.

2. The method according to claim 1, further comprising:

determining a floor limit for the second bidding; and withdrawing the at-risk volume from the allocation of the portfolio of consumer debts between the first buyer and the second buyer if a winning bid in the second bidding does not equal or exceed the floor limit.

3. The method according to claim 2, further comprising:

offering the withdrawn at-risk volume in a subsequent bidding between the first buyer and the second buyer.

4. The method according to claim 1, further comprising:

entering into the first and second sales contracts upon conclusion of the initial bidding, the sales contracts specifying: a contract length, two or more time periods in the contract length for purposes of re-allocating the portfolio between the first buyer and the second buyer, and a designation of the at-risk volume for each time period following the first time period.

5. The method according to claim 4, wherein each time period lasts three months, and wherein, in addition to the second bidding, three additional biddings are held on a quarterly basis to re-allocate the portfolio between the first buyer and the second buyer.

6. The method according to claim 4, wherein the first sales contract further specifies a minimum portion of the portfolio to be allocated to the first buyer during each time period.

7. The method according to claim 1, wherein the portfolio of consumer debts are graded based on a quality associated with the consumer debts, and wherein the allocation of the portfolio between the first buyer and the second buyer is based at least in part on the quality grading of the consumer debts.

8. A computer-implemented method using a computer system having a computer processor and a database for implementing a recurrent bidding process for a seller to dispose of an inventory of assets stored in the database, the method comprising the steps of:

offering, using the computer processor, the inventory of assets in an initial bidding among a plurality of potential buyers to select a limited number of exclusive buyers;

allocating, for a first time period, the inventory of assets to the limited number of exclusive buyers, as determined by the computer processor, based at least in part on bidding prices in the initial bidding;

entering into sales contracts with the limited number of exclusive buyers allocating a portion of the inventory to each of the exclusive buyers;

designating a portion of the inventory of assets as an at-risk volume for a second time period;

offering, using the computer processor, the at-risk volume in a second bidding among the limited number of exclusive buyers; and selecting one or more winning bidders using the computer processor, wherein the one or more winning bidders in the second bidding are allocated the at-risk volume for the second time period.

9. The method according to claim 8, further comprising:
determining a floor limit for the second bidding; and
withdrawing the at-risk volume from the allocation of the inventory of assets among the exclusive buyers if a winning bid in the second bidding does not equal or exceed the floor limit.

10. The method according to claim 9, further comprising:
offering the withdrawn at-risk volume in a subsequent bidding among the exclusive buyers.

11. The method according to claim 8, wherein the inventory of assets are graded based on a quality associated with the assets, and wherein the allocation of the portfolio among the exclusive buyers is based at least in part on the quality grading of the assets.

\* \* \* \* \*

UNITED STATES PATENT AND TRADEMARK OFFICE
CERTIFICATE OF CORRECTION

PATENT NO. : 7,647,268 B1  
APPLICATION NO. : 11/417049  
DATED : January 12, 2010  
INVENTOR(S) : Bonner et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 463 days.

Signed and Sealed this

Twenty-eighth Day of December, 2010

David J. Kappos  
*Director of the United States Patent and Trademark Office*